United States Patent [19]
Farr

[11] 3,750,853
[45] Aug. 7, 1973

[54] LOAD TRANSMITTING STRUTS
[75] Inventor: Glyn Phillip Reginald Farr, Birmingham, England
[73] Assignee: Girling Limited, Birmingham, England
[22] Filed: Aug. 23, 1971
[21] Appl. No.: 173,953

[30] Foreign Application Priority Data
Aug. 21, 1970 Great Britain.................. 40,422/70
Mar. 17, 1971 Great Britain..................... 7,071/71

[52] U.S. Cl............ 188/196 R, 188/71.8, 188/79.5, 188/217
[51] Int. Cl............................................ F16d 65/54
[58] Field of Search ...................... 188/71.8, 79.5 P, 188/79.5 SC, 79.5 GE, 217, 196 R, 196 A, 331

[56] References Cited
UNITED STATES PATENTS
2,157,994 5/1939 Baisch......................... 188/79.5 SC Primary Examiner—Duane A. Reger
Attorney—Scrivener, Parker, Scrivener & Clarke

[57] ABSTRACT

An adjustable length strut includes a pair of relatively movable members defining a pair of load bearing faces which in part define a closed chamber containing fluent material, the fluent material spacing the faces and means is provided movable relative to the faces to vary the configuration of the chamber and therefore of the fluent material to vary the relative position of the faces. The members and movable means may be variously pistons, cylinders or sleeves slidable on pistons or in cylinders. Such a strut has particular, but not exclusive, application to vehicle wheel brakes as the adjustable element of a wear compensating auto-adjustor or a lock actuator.

22 Claims, 21 Drawing Figures

PATENTED AUG 7 1973      3,750,853

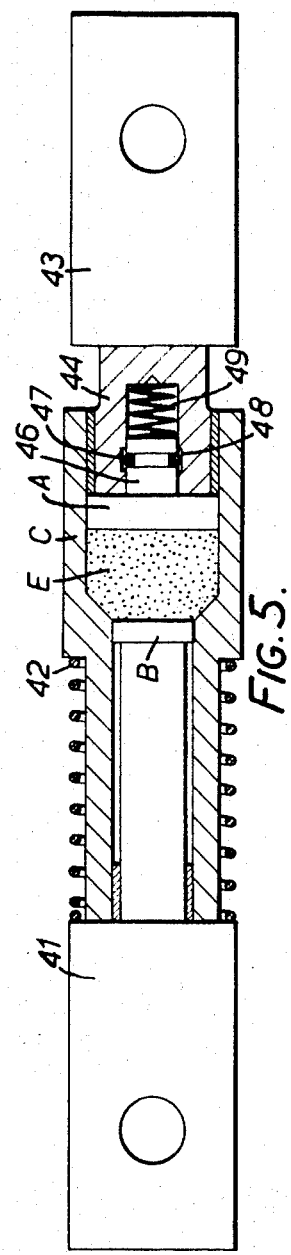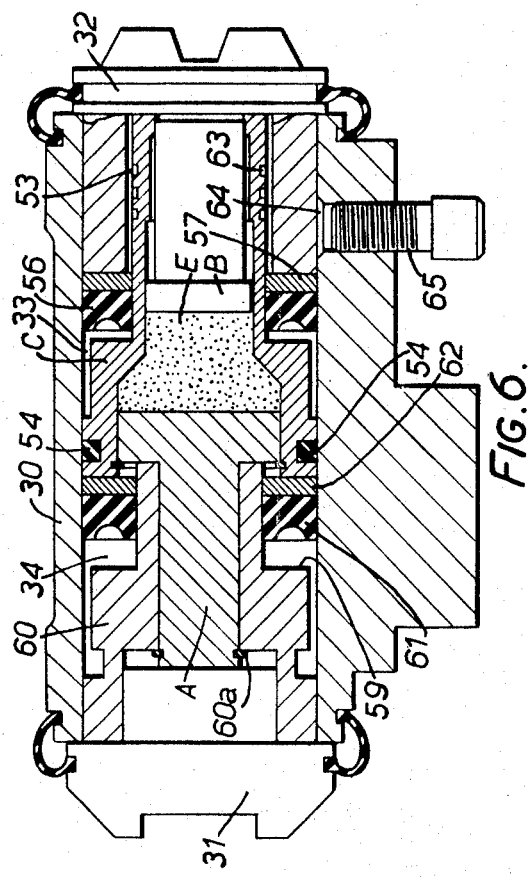

LOAD TRANSMITTING STRUTS

This invention relates to load transmitting struts of adjustable length, particularly, but not exclusively, for use in vehicle wheel brake assemblies.

Such struts, comprising a pair of relatively rotatable screw threaded members are used, for example as the adjustable elements in automatic adjuster arrangements for internal shoe drum brakes, relative rotation being effected in response to a linear displacement through the intermediary of a pawl and ratchet device for example, and also in lock actuators for holding applied the friction elements of a wheel brake for parking purposes. The use of relatively rotatable screw-threaded members and the need to convert linear displacements into rotary movements results in arrangements which are relatively complex or difficult to manufacture to required tolerances or both. It is also difficult to ensure an adequate degree of reliability in operation due, for example, to the vulnerability of screw-threaded parts to the ingress of dirt and corrosive moisture.

The present invention provides an adjustable length strut assembly which avoids the use of relatively rotatable screw threaded parts and adjustment of which is effected directly in response to linear displacement.

More specifically the invention provides an adjustable length strut comprising a closed chamber, a fluent material in the chamber spacing a pair of relatively movable load bearing faces, in part defining the chamber, means being provided movable relative to the faces to vary the configuration of the chamber and, thereby, the fluent material between the faces to vary the relative position of the faces.

Each face may have an aggregate area different from the aggregate area of the other face and the means movable relative to the face may define with each face a zone of a given configuration but variable size, the zones receiving the material and together forming the variable configuration chamber. Advantageously each face is a single face.

The invention also includes a vehicle wheel brake assembly incorporating such a strut as an adjustable element of a wear compensating auto-adjuster or of a lock actuator.

Some particular embodiments of the invention will now be described, by way of example only, with reference to the accompanying drawings, in which FIG. 1 is an axial cross-section of one embodiment of adjustable length strut in accordance with the invention;

FIG. 5 is an axial section of a drum brake shoe adjuster;

FIG. 6 is an axial cross section of a vehicle brake wheel cylinder incorporating a strut according to the invention as a lock actuator;

Figure 9A:
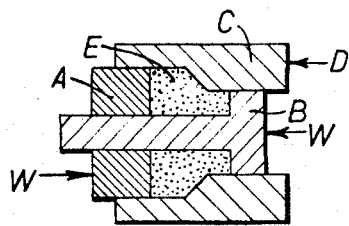
Figure 9B:
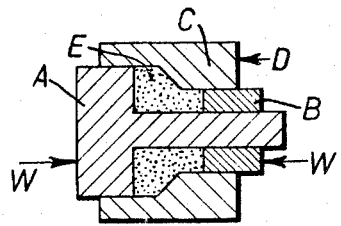
Figure 9C:
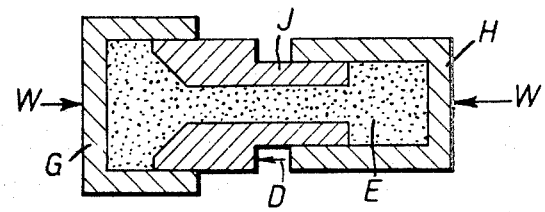
Figure 9D:
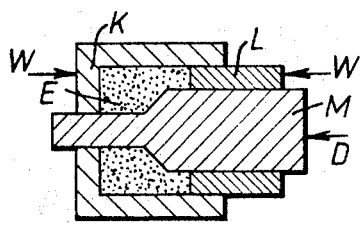
Figure 9E:
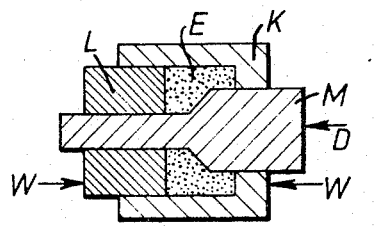
Figure 9F:
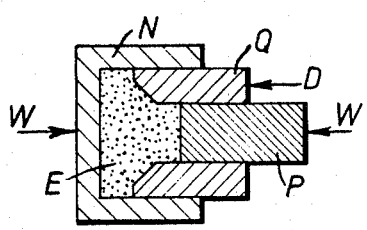
Figure 10:
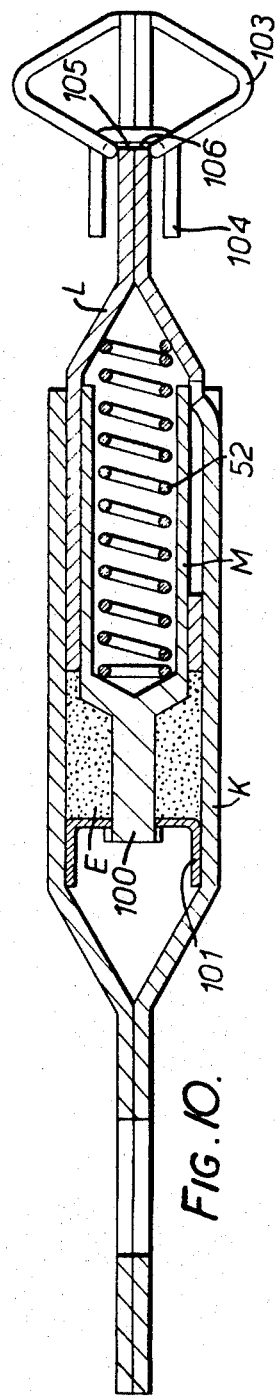
Figure 11:
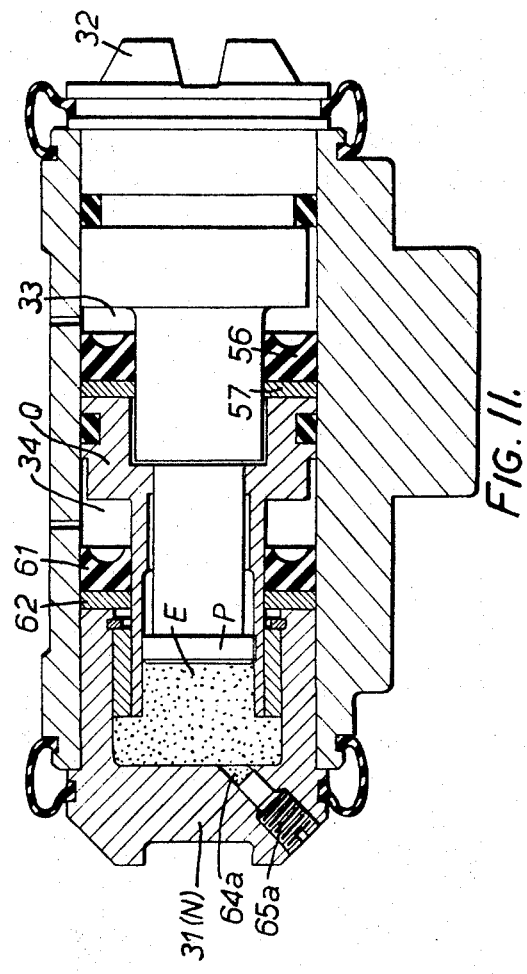
Figure 12:
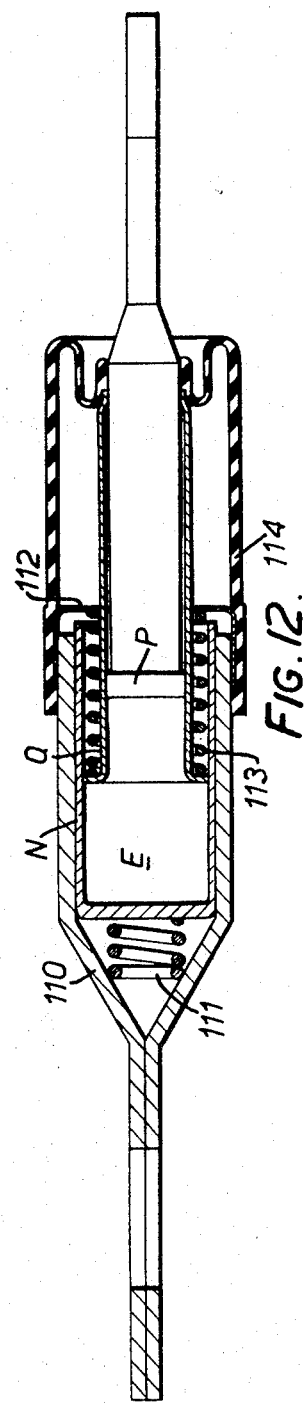

FIGS. 9A — 9G are diagrammatic representations of various configurations of struts according to the invention;

FIG. 10 is an axial cross section of a strut equivalent to FIG. 9D arranged as an adjuster;

FIG. 11 is an axial cross section of a further embodiment of wheel cylinder incorporating the strut of FIG. 9F as a lock actuator;

FIG. 12 is an axial cross-section of a wheel cylinder incorporating the strut of FIG. 9F as an adjuster.

Figure 13:
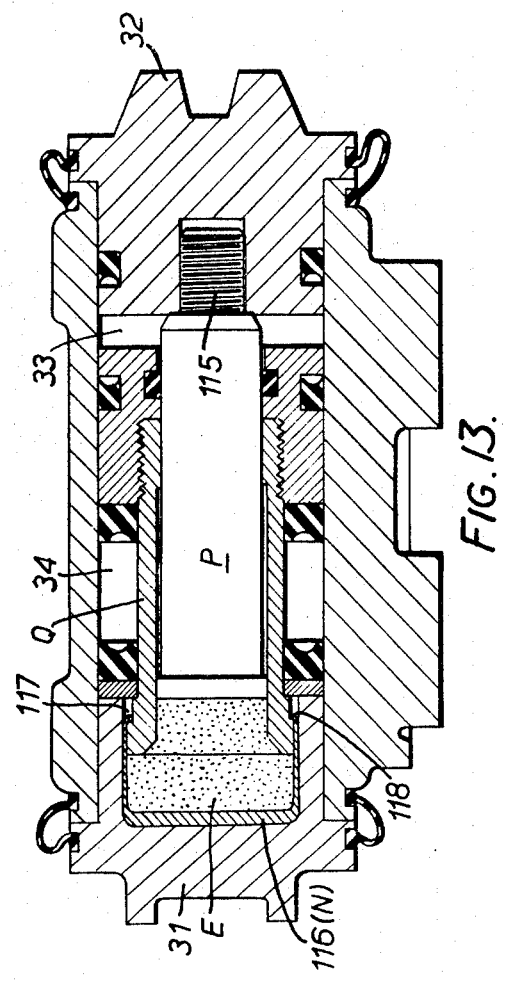
Figure 14:
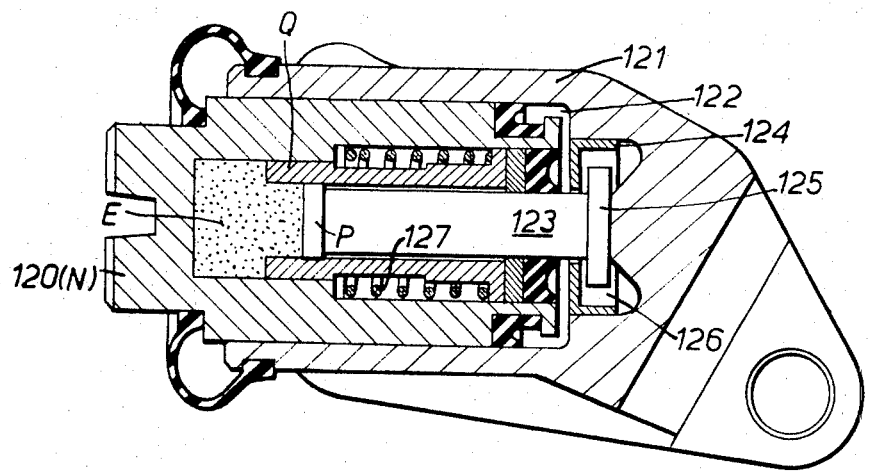
Figure 15:
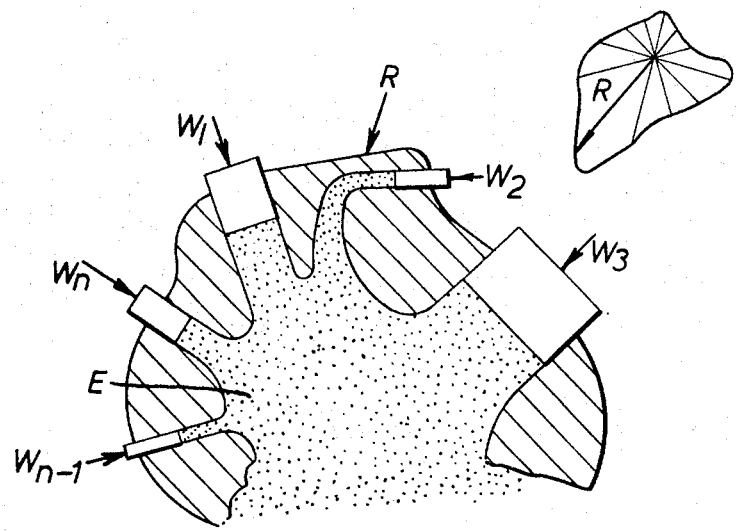

FIG. 13 is an axial cross-section of a further embodiment of wheel cylinder incorporating the strut of FIG. 9F as a lock actuator;

FIG. 14 is an axial cross-section of a back stop incorporating the strut of FIG. 9F as an adjuster, and FIG. 15 is a diagram of a theoretical general arrangement of various sizes and dispositions of pistons of a generalised strut.

Figure 1:
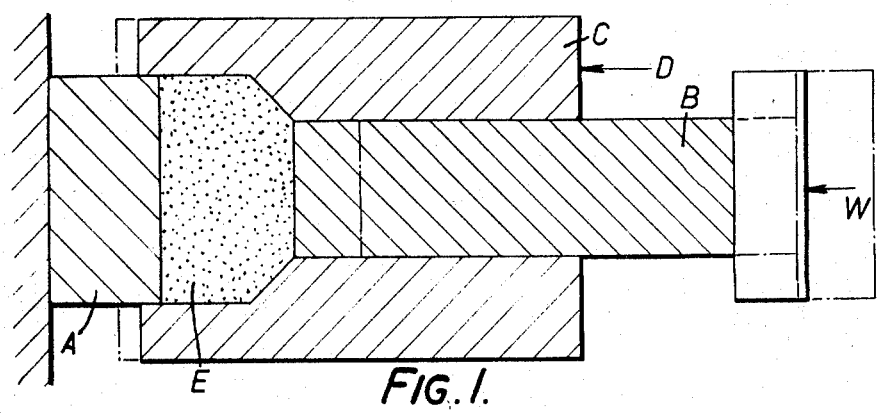

The adjustable length strut shown in FIG. 1 comprises a pair of load bearing faces provided by the faces of a large piston A and a small piston B respectively. The faces of the pistons are spaced by a fluent material E in a chamber defined by the piston faces and a member, being a stepped bore sleeve or cylinder C in which the pistons work, movable relative to the load bearing faces to vary the configuration of the chamber. The material E is a fluent but compacted mass of granular material, such as small diameter steel spheres, say of 0.01 to 0.04 inch diameter.

Assuming the large piston A to be mechanically fixed relative to some fixed structure, a load W applied to the small piston B is transmitted to the large piston A by the granular mass E, which acts in the manner of a liquid in that "hydrostatic" forces are transmitted in all directions within the mass. This results in the granular mass pressing outwardly on the side wall of the cylinder bore to provide a frictional locking action of sufficient magnitude to lock the strut parts solidly together.

To effect adjustment, a force D is applied to the cylinder C moving it to the left, as drawn, to force the large piston A into the cylinder bore with corresponding displacement of the granular mass in to the smaller bore, forcing the piston B outwardly, to the right, thereby lengthening the strut. To shorten the strut, the cylinder C is moved in the opposite direction (to the right) while the piston B forces the granular mass back towards the left hand end of the cylinder bore.

It will be apparent that the above described strut assembly is capable of useful application in a wide variety of mechanical arrangements, but the three particular applications shown in FIGS. 2 to 8 described below are all in the field of vehicle wheel brakes, where the invention has particular utility. In the following description of these Figures corresponding parts of the above described strut are identified by the same reference letters as above.

Figure 2:
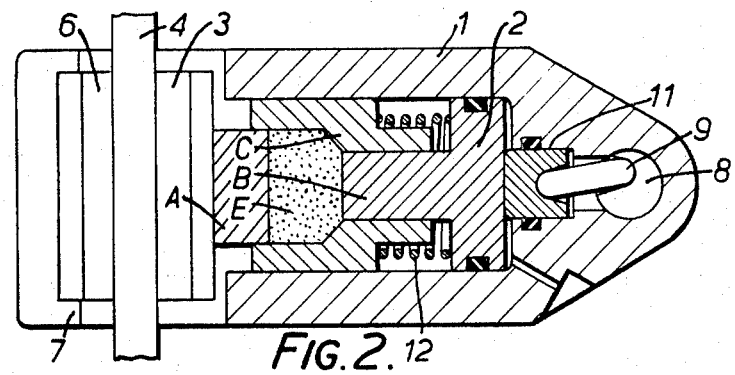
FIG. 2 is an axial section of a vehicle wheel disc brake actuator.

FIG. 2 illustrates the above described strut assembly incorporated in a disc brake actuator, as an automatic wear compensating adjuster. The brake illustrated is a spot type reaction caliper disc brake comprising a caliper body 1 formed with a cylinder bore for an hydraulic actuating piston 2 having a reduced diameter extension B extending into the smaller bore of stepped bore cylinder C. The large piston of the cylinder C bears against a directly applied brake pad assembly 3 on one side of brake disc 4, the indirectly applied pad 6 being mounted on the opposite side of the disc in caliper arm 7. A hand brake applying mechanism comprises a rotatable cam 8 operating through a rockable dolly 9 onto a plunger 11 abutting the piston 2. A light coil compression spring 12 acts between the piston 2 and cylinder C to provide a biasing force corresponding to the force D.

In use, the strut assembly A, B, C, E acts as a solid strut in transmitting brake actuating forces from piston 2 to the pad assembly 3. When wear compensating adjustment is required, a clearance is created between the piston 2 and the plunger 11, so that the piston 2 is relieved of load. The force D applied by spring 12 moves the cylinder C to the left, with concomitant displacement of the granular mass E and piston 2, until the clearance is taken up. In this manner, the handbrake mechanism is automatically kept fully adjusted.

By way of example, the following dimensions and forces may be regarded as typical for a passenger car brake of the above described form:

| | |
|---|---|
| Diameter Piston A | 1 inch |
| Diameter Piston B | 5/8 inch |
| Diameter Piston 2 | 1.34 inch |
| Granular medium | Steel spheres 0.01–0.04 inch diameter |
| Deflection of granular mass | Less than 0.02 inch. |
| Hydraulic actuating pressure | 1500 psi |
| Corresponding "hydrostatic" | 7,000 psi |
| Handbrake force | 2100 lbs. |

Figure 3:
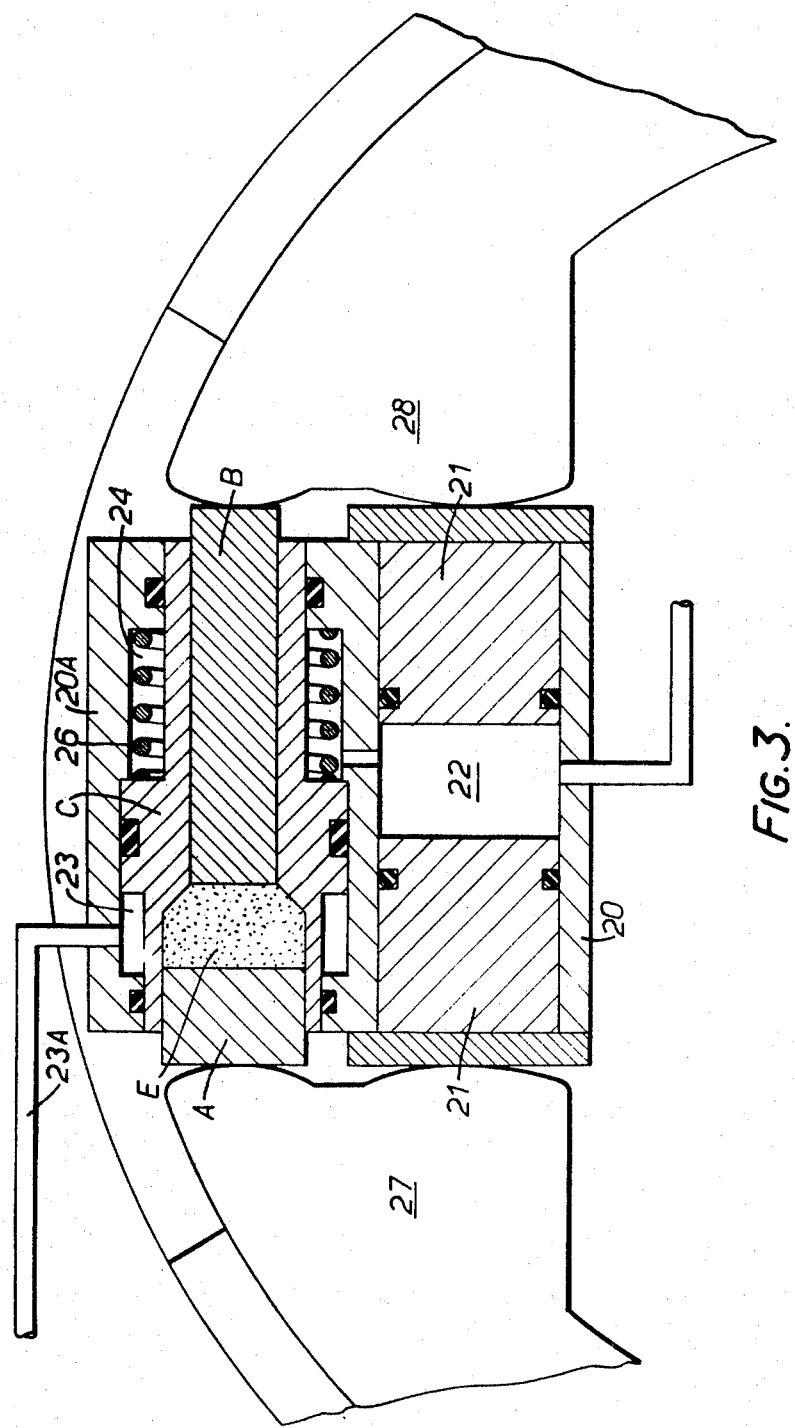
FIG. 3 is a part sectional elevation of an internal shoe drum brake incorporating a lock actuator.

In FIG. 3, the strut assembly of FIG. 1 is employed as a lock actuator for an internal shoe drum brake. The brake comprises a double-ended wheel cylinder 20 having opposed pistons 21 and a working chamber 22. Mounted on or fast with the wheel cylinder is a housing 20A for the adjustable strut assembly A B C E, the cylinder C also taking the form of a double acting piston subject to the pressures prevailing in respective cylinder spaces 23 and 24. Cylinder space 23 is connected to a parking lock pressure line 23A and cylinder space 24 is connected to the working chamber 22. A coil compression spring 26 biases the cylinder C to the left of the housing 20A. The projecting outer ends of the pistons A and B directly abut the webs of the brake shoes 27 and 28 of the brake.

Service (foot) brake operation is effected in the usual way.

The cylinder space 23 is normally held under pressure, holding the cylinder C in its extreme right-hand position as illustrated. To apply the lock, the parking brake pressure is released, and the service brake is applied, so that the pressure acting in cylinder space 24 acts to move the cylinder C to the left, thereby lengthening the strut to maintain the pistons A and B in contact with the shoe webs. Upon release of the service brake pressure, the shoe return forces are taken by the pistons A and B, loading of which causes the strut to lock up in its extended position. The lock is subsequently released by re-applying parking lock pressure to the cylinder space 23 to return the cylinder to the right.

Figure 4:
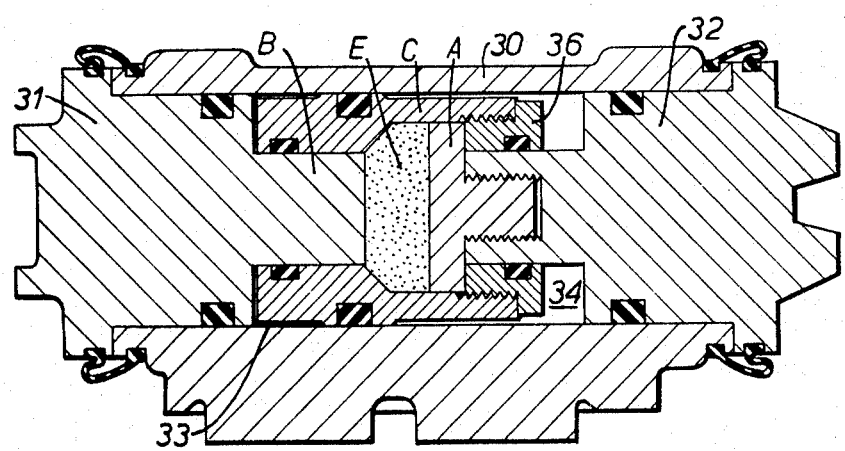
FIG. 4 is an axial section of a combined wheel cylinder and lock actuator.

FIG. 4 illustrates a double-ended wheel cylinder for an internal shoe drum brake in which the strut assembly is built into the cylinder so as to act between the opposed main pistons thereof. The wheel cylinder comprises a cylinder body 30 having opposed main pistons 31 and 32, whose projecting outer ends are formed as tappets for direct engagement with the respective shoe web tips (not shown). The strut assembly again comprises main components A, B, C, E, piston B being formed as a reduced portion of left-hand main piston 31, while piston A is screwed securely into the right hand main piston 32. The cylinder C is also formed as an intermediate floating piston which defines with the respective main pistons to either side of it a service brake pressure chamber 33 and a handbrake pressure chamber 34. Screwed into the open right-hand end of the cylinder C is an end cap 36 which is slidably sealed over a projecting boss of the right-hand main piston 32 to complete the sealing of the chamber 34, and also to co-operate with the outer face of piston A in limiting relative movement between the cylinder C and the pistons A and 32.

In use, the wheel cylinder is mounted in a drum brake in which only one main piston (say the left-hand piston 31) moves in the cylinder body 30 during brake actuation, the other piston (say 32) acting as a fixed abutment. For reverse braking the main pistons reverse these functions. During normal running, the pressure chamber 34 is held under full system pressure, thereby providing an "hydraulic lock" against relative movement of the components C, 36 and A, 32. For service brake actuation, pressure is applied to chamber 33 to force out the left-hand main piston 31, the other components remaining in their illustrated position. The cylinder volume containing the granular mass E is thus increased, but this increase in volume is taken up when the brake pressure is released and the piston 31 returns to its retracted position. If, say on reverse braking, the piston 31 remains stationary, the components C, 36, A and 32 move out to the right as one.

To apply the lock, the pressure in chamber 34 is relieved and service brake pressure is applied to chamber 33 to urge the piston 31 and cylinder C apart, the end-cap 36 now sliding to the right over the projection of piston 32, so that the cylinder C moves over the piston A to keep the granular mass compressed by displacing it towards the smaller end of the cylinder bore. Upon release of the service brake pressure, the shoe return forces are transmitted, as in the earlier examples, to the granular mass which now acts to lock the strut assembly against contraction. To release the lock, the chamber 34 is re-pressurised to move the cylinder C to the left, thereby effectively increasing the cylinder bore volume to relieve the strut of load and permit its return to the illustrated position.

FIG. 5 shows an automatic adjuster for an internal shoe drum brake in which the small piston B is fast with one shoe shackle 41, and the force D is applied by a coil spring 42. A second shoe shackle 43 carries a cup-shaped housing 44 to receive a stem 46 on the piston A, which has a limited amount of axial lost motion relative to the housing 44 by virtue of the axial clearance between a circlip 47, carried by the stem 46, and an annular groove 48 in the housing 44. A coil compression spring 49 urges the stem outwardly of the housing 44.

When the brake is applied to relieve the adjustor of load, the spring 49 urges the piston A to the left, to take up the lost motion between the circlip and the groove 48 and the cylinder body C is urged to the right, relative to the piston to lengthen the strut to take up the brake shoe clearance. When braking pressure is relieved, the shoe return springs load the adjuster strut which can, however, relax to the extent of the clearance between the circlip and the groove 48, thereby guarding against over adjustment due, for example to adjustment taking place under high drum deflection conditions as during heavy braking or when the drum is very hot.

FIG. 6 illustrates a double ended wheel cylinder for an internal shoe drum brake which is somewhat similar to that shown in FIG. 4.

The wheel cylinder comprises a cylinder body 30, having opposed main pistons 31 and 32, the projecting outer ends of which are formed as tappets for engagement with the respective shoe webs (not shown). The strut assembly again comprises main components A, B, C and E, piston A abutting the inner end of main piston 31 and piston B being slidably housed within a portion of cylinder C which is contained within a bore 53 of main piston 32. The cylinder C is also formed as an intermediate floating piston, sealed against the main cylinder wall by a sealing ring 54, a service brake pressure chamber 33 being defined between a shoulder of cylinder C and a seal 56. Between the seal 56 and the piston 32 there is disposed a backing ring 57 surrounding the cylinder C. A brake lock pressure chamber 34 is defined between a shoulder 59 of a member 60 surrounding piston A and a seal 61 between which and cylinder C is disposed a further backing ring 62.

In use the wheel cylinder is mounted in a drum brake for actuation of the brake shoes, only one main piston (say 32) moving during actuation of the shoes. During normal running conditions, the brake lock chamber 34 is maintained pressurised so as to provide a "hydraulic lock" against relative movement of the cylinder C and member 60; when pressure is applied to the service chamber 33, the pressure is transmitted through seal 56 and washer 57 to main piston 32 causing the latter to move outwardly. The pressure is also transmitted through cylinder C, the ring 62, seal 61, "hydraulic lock" in chamber 34 to member 60 and thence to the main piston 31 which acts in this case as a fixed abutment. Member 60 is engaged behind a circlip 60a on piston A so that the latter moves with member 60.

To apply the lock, to provide a parking brake, the pressure in chamber 34 is relieved and service brake pressure is applied to chamber 33 to urge the cylinder C to the left relative to piston A, thereby displacing granular mass from the wide bore portion of cylinder C into the narrow portion to push the piston B to the right against piston 32. Upon release of service pressure the shoe return forces are transmitted to the granular mass which now acts to lock the strut assembly against contraction. To release the lock, the chamber 34 is re-pressurised to move the cylinder C to the right so as effectively to increase the cylinder volume to relieve the strut of load and permit its return to the illustrated position.

A particular feature of this construction is that the portion of the cylinder C within the bore 53 has a number of notches 63, access to which can be obtained by passing a tool through an opening 64 (normally closed by a plug 65) when the cylinder is in the locked condition thereby enabling the cylinder to be prised free in the event of jamming in the locked position. This provision has particular application to heavy vehicles as lorries which are extremely difficult to move should the brakes jam on.

Figure 7:
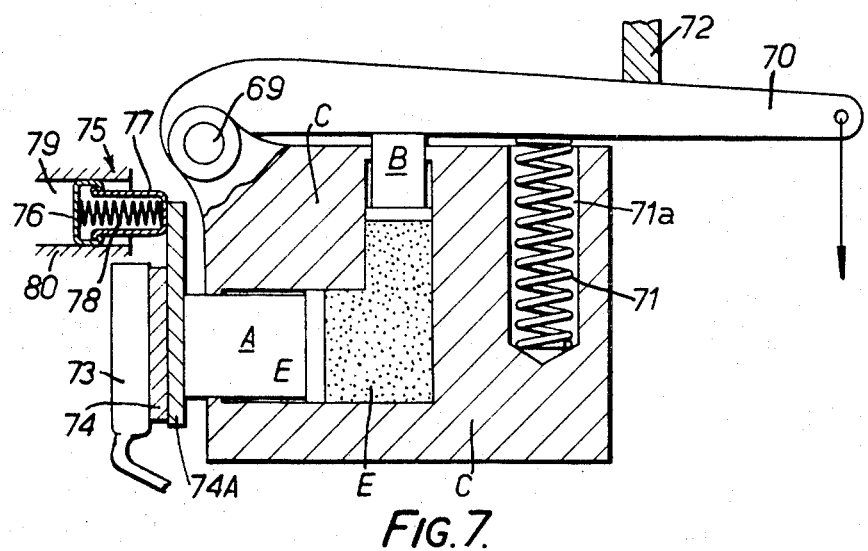
FIG. 7 is an axial cross-section of an adjuster for a disc brake.

Although the embodiments described above are all arranged to transmit forces in two opposite directions, it is possible for the strut of the invention to transmit forces from one direction to another, e.g. along a right angle path, and such an arrangement is shown in FIG. 7.

The pistons A and B move in this case respectively within larger and smaller bores extending at right angles within a member C which is itself pivoted at 69 for swinging movement towards and away from a brake disc 73. The larger piston A actuates a brake pad 74, the backing plate 74a of which extends into contact with a first member 77 of a back stop designated generally 75, the member 77 moving within a further member 76 of the back stop, both members having turned over portions to limit their movement away from one another under the action of a spring 78. The member 76 is slidable within a bore 79 formed in a fixed member 80.

The arrangement is operated by a lever 70 normally connected to a handbrake pull, such as a cable.

The lever 70 is normally urged by a spring 71, acting against the inner end of a blind bore 71a in the member C, against a fixed stop 72 and the granular material E, within the chamber defined by member C and the end faces of pistons A, B, is normally under the compressive effect of the spring 78 and therefore acts as a solid strut so that the member C pivots about 69 until the piston B is urged against the lever 70. When a downward pull is applied to the lever 70, the member C, pistons A, B and mass E move as one about the pivot 69 and urge the pad 74 into contact with the disc 73. At the same time the spring 78 is compressed by the back plate 74 acting on member 77.

Assuming that wear of the pad has taken place, the member 77 will move sufficiently to push member 76 along the bore 79. Since the extent of the return movement of member 77 is determined by the co-operating turned over portions, the spring 78 cannot push the pad back to its original position when the lever 70 is released and urged by spring 71 against the stop 72. Consequently, the member C will be urged by the spring 71 along the piston A causing material E to be displaced from the larger bore into the smaller bore in member C, thus forcing the piston B back into contact with lever 70. In this manner, automatic adjustment is made for pad wear at each application of the brakes. In some applications, where drag on the disc may be tolerated, the back stop 75 may be omitted.

Figure 8:
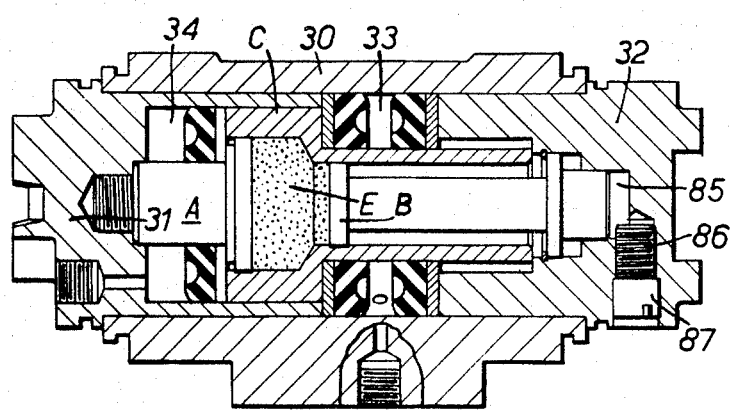
FIG. 8 is an axial cross-section of a wheel cylinder incorporating a strut according to the invention as a lock actuator.

FIG. 8 shows a double ended wheel cylinder somewhat similar to that of FIG. 6. The same reference numerals are used in this Figure as are used in FIG. 6 for equivalent parts.

In the present embodiment, the piston A is screwed into the piston 31 to simplify the construction of the cylinder. As before the strut comprises pistons A and B and cylinder C defining the variable configuration chamber for material E. The cylinder C is formed as an intermediate floating piston in cylinder 30 and defines with the cylinder 30 and pistons 31, 32 a service chamber 33 and brake lock chamber 34. An emergency lock release is provided, in the present embodiment, by a chamber 85 defined between pistons 32 and B and filled with normally compressed granular material, such as material E. The chamber 85 communicates with an outlet opening 86 closable by a plug 87. In the event of the strut jamming in its locked condition, the plug 87 can be slackened or removed to release the compression of the material in chamber 85. This allows the piston B to move towards the righthand of FIG. 8 so that the strut can relax sufficiently to release the lock.

FIGS. 9A and 9B show modifications of the strut shown in FIG. 1.

In FIG. 9A the small piston B is provided with an extension which passes through a bore in piston A. Locking and adjustment are effected as described above. In FIG. 9B, an extension is provided on the large piston A, the extension passing through a bore in piston B. The adjustable length strut shown in FIG. 9C comprises a pair of load bearing faces provided by the end faces of two cylinders G, H, the faces being spaced by fluent material E in a chamber defined by the faces and a relatively movable member in the form of a sleeve J. The cylinders are supported for relative sliding movement on the sleeve J and have different cross-sectional areas. The sleeve J is movable to vary the configuration of the chamber.

Assuming the large cylinder G to be mechanically fixed relative to some fixed structure, a load W applies to the small cylinder H is transmitted to the large cylinder G by the mass E.

As in the above described embodiments, adjustment is effected by removing the load W and applying a force D to the sleeve J to move it to the left and to force it into the large cylinder G. This displaces the mass E along the sleeve J into the small cylinder H, forcing the latter to the right to lengthen the strut. To shorten the strut, sleeve J is moved to the right causing the mass E to flow from cylinder H into cylinder G.

FIG. 9D shows a strut in which the load bearing faces are provided by the face of a cylinder K and a sleeve L and the means for varying the configuration of the chamber for the mass E is a stepped piston M slidable in the sleeve L in turn slidable in the cylinder K. The piston M is stepped to form an extension passing through a bore in the face of the cylinder K. Locking is effected by compressing the mass as described above and adjustment of length by removing the forces W and aplying a force D to move piston M either to left or right.

FIG. 9E shows a similar arrangement to that of FIG. 9D but with the load bearing surface of cylinder K smaller than that of sleeve L.

In the embodiment of FIG. 9F, the load bearing faces are provided by the end faces of cylinder N and piston P, slidable in sleeve Q in turn slidable in cylinder N. The sleeve Q is movable relative to cylinder N and piston P to vary the configuration of the chamber for mass E and defined thereby.

Figure 9G:
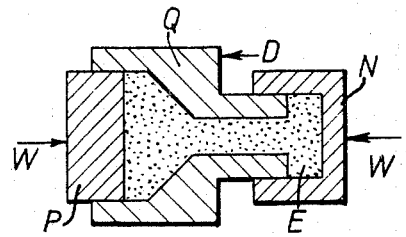

The arrangement of FIG. 9G is similar to that of FIG. 9F but with the relative areas of the two load bearing surfaces reversed. The locking and adjustment procedure for both these embodiments is the same as for the previous embodiments.

It will be apparent that the strut assemblies described with reference to FIG. 9 are again capable of a wide variety of useful applications, such as an anti-collapse device for use in jacks, but the particular applications described below are related to vehicle wheel brakes.

FIG. 10 shows a construction using the strut of FIG. 9D, arranged for use as a "one shot" adjuster for a drum brake. The cylinder K and sleeve L are connected respectively at their outer ends to the ends of a pair of brake shoes which are expanded in the normal manner by a hydraulic double ended cylinder (not shown). The piston M slides within the sleeve L and has an extension or stem 100 engaged in an opening in a cup 101 providing one of the load bearing faces and forming one end of a working space filled with granular material E. The sleeve L is urged outwardly relative to the piston M by a spring 102 within the latter. A spring 103, of strength less than the shoe return springs but greater than that of spring 102 acts between the ends of a shackle rigid with sleeve L and a U-shaped member 104 against which the end of the shoe bears. There is a small gap 105 between member 104 and an edge 106 on the shackle to provide a degree of lost motion between the edge 106 and member 104.

When the shoes are expanded by the hydraulic cylinder the spring 102 urges the sleeve L and cylinder M apart, causing granular material to flow from left to right in the drawing to lengthen the strut. When the hydraulic pressure is removed, the shoe return force is reapplied to cylinder K and sleeve L to lock the strut, but a slight relaxation is permitted before locking takes place because the gap 105 is taken up against spring 103 to prevent overadjustment and allow for contraction and distortion of the drum.

FIG. 11 shows a wheel cylinder basically similar to that of FIG. 6, but including the strut assembly of FIG. 9F as a lock actuator. The references used in FIG. 2 are used in this Figure where applicable. In this case the cylinder N also forms the piston 31, which latter slides upon sleeve Q. As before a brake lock chamber 34 is pressurised continuously during normal use of the brake to prevent relative movement of sleeve Q and piston 31 during normal braking. Thus, when service pressure is applied to chamber 33, either piston 32 or the assembly including and to the left of seal 56 moves outwardly of the cylinder to apply the brake.

To lock the brake for parking, the lock chamber 34 is depressurised allowing sleeve Q to move to the left (as seen in the drawing) into cylinder N displacing material E into sleeve Q and extending the strut, the strut locks on releasing the service pressure, under the action of the shoe return force. Unlocking is effected as described previously. An opening 64a closed by a plug 65a is again provided for releasing the compression of material E in the event of jamming.

Referring to FIG. 12, this shows basically the arrangement of FIG. 9F as an adjuster for a drum brake. The cylinder N is movable axially within a main cylinder body 110, a spring 111 acting between cylinder 110 and the end of the cylinder N. Sleeve Q is disposed within cylinder N for sliding movement and forms an elongated cylinder within which slides piston P, the piston P, sleeve Q and cylinder N defining a chamber filled with a fluent mass E. A cap 112 encircling the sleeve Q is a press fit onto the open end of cylinder 110 and is normally disposed with a gap e of say, 0.30 inch, between its inner end and that of cylinder N when the adjuster is under the brake shoe return force. A spring 113 acts between the cap 112 and sleeve Q, the force of this spring 113 being less than that of spring 111 for a purpose to be described hereinafter. A boot 114, of rubber for example, is provided to prevent ingress of dirt, etc. The ends of cylinder 110 and piston P are bifurcated to receive brake shoes in known manner.

The operation of the adjuster is as follows:

The adjuster as shown is under the action of the shoe return springs and the granular material E acts as a solid strut as before. When the brake shoes are applied against the drum, the force on the strut is maintained by spring 111 until the clearance $e$ is taken up whereupon the spring 111 ceases to have effect. When this happens, and assuming wear has taken place in the brake linings, the weaker spring 113 urges the sleeve Q to the left in the drawing, causing material E to be displaced from the cylinder N into the sleeve Q and the piston P to be moved to the right to take up all clearance between the adjuster and the shoes. When the brakes are released, the adjuster once more locks solid as a strut, but the shoe return force is sufficient to overcome the force of spring 111 and move the cylinders N and 110 relatively by an amount corresponding to clearance $e$, thereby ensuring a shoe/drum clearance in normal use. The action of spring 113 could be supplemented by a spring disposed within the granular medium and acting between the end of piston P and cylinder N.

FIG. 13 shows a wheel cylinder with lock actuator basically similar to FIG. 11 but having certain modificiations. The references of FIG. 11 will be used wherever possible. In this embodiment, the piston P is rigidly secured to piston 32 by a screwed spigot 115 and the mass E is within a chamber formed partly within sleeve Q and a cap 116 lining the interior of piston 31 and effectively forming the cylinder N. The cap 116 is captive on sleeve Q by virtue of inwardly directed end portion 117 engaging behind a shoulder 118 on sleeve Q. This arrangement facilitates assembly and dismantling of the pistons.

The lock chamber 34 is normally pressurised and the brake shoes expanded by applying pressure to service chamber 33. When pressure in chamber 34 is exhausted or the pressures are adjusted to make that in 33 greater than that in 34, sleeve Q can move relatively to cylinder N to adjust the length of the strut. The strut is locked by repressurising chamber 34.

FIG. 14 shows a back-stop incorporating a strut according to FIG. 9F for extending the piston 120 of the back stop to compensate for brake lining wear and minimise the piston travel on brake application.

The piston 120 is slidable in cylinder 121 and is operated by the application of fluid pressure to chamber 122.

The strut includes a piston P slidable in sleeve Q which is, in turn, slidable in a bore in piston 120. This latter piston effectively forms the cylinder N of the strut and defines with the sleeve Q and piston P the variable configuration chamber for material E. The piston P is formed with a spindle 123 which extends with clearance through a limit member 124 into a chamber 126. The end of the spindle in chamber 126 is provided with an enlargement 125 which cannot be withdrawn through the member 124.

For brake operation fluid pressure is applied to chamber 122 to move the piston 120 and, through the clearance in member 124, to chamber 126 where it acts on spindle 123 to move the strut as a unit to apply the brake. Should wear in the brake lining have occurred, the enlargement 125 will abut member 124 while the piston 120 and sleeve Q will continue to move to the left hand of FIG. 14. This effectively extends the strut. When the pressure in chambers 122 and 126 is relieved the piston 120, sleeve Q and piston P will move back under the action of the brake shoe return springs until the enlargement 125 contacts the end of cylinder 121. At this point the material E will be placed under load to maintain the strut in its extended condition.

A spring 127 is provided between the piston 120 and sleeve Q to enable the strut to be reduced in length, for example when a worn brake lining is replaced. When the shoe return spring force is removed, the spring 127, which has been compressed during operation, expands pushing sleeve Q back until a shoulder 128 on sleeve Q abuts a washer 129 held between the spring 127 and the piston 120. This movement of sleeve Q increases the volume of the chamber containing the material E so that the piston 120 with sleeve Q can be pushed to the right until the material E is compacted.

FIG. 15 shows a general arrangement of $n$ pistons in equilibrium, and the accompanying polar diagram shows a varying force R.

The system of forces $W_1, W_2 - W_n$ will be kept in equilibrium by friction forces in the medium and friction between the cavity walls and the medium.

The fact that equilibrium is sustained by friction effects will allow a variation in the external loads without upsetting the equilibrium condition. In particular, if the resultant force R is allowed to vary in direction and magnitude its maximum values may be recorded in a polar diagram.

The polar diagram may be used to determine the mode of the mechanism i.e. if the force R is less than its polar co-ordinate then the mechanism is in equilibrium and can be used to transmit force.

When the force R is greater than its polar coordinate the cylinder will move to effect adjustment.

While in the above described embodiments each load bearing face of the strut has been provided by a single member, the load bearing faces may be provided by a plurality of members which may have the same or different aggregate areas.

What is claimed is:

1. An adjustable length strut including relatively movable members defining a pair of load bearing faces, said faces in part defining a closed chamber, granular fluent material in the chamber spacing said faces and means movable relative to the faces to vary the configuration of the chamber and, thereby, the fluent material between the faces to vary the relative position of the faces.

2. A strut according to claim 1 in which each face has an aggregate area different from the aggregate area of the other face and the means movable relative to the faces in part define with each face a zone of a given configuration but variable size, the zones receiving the material and together forming the variable configuration chamber.

3. A strut according to claim 2 in which each face is a single face.

4. A strut according to claim 3 in which the faces are piston faces of different cross-sectional area and opposed to one another and the movable means is a sleeve of stepped bore receiving the pistons.

5. A strut according to claim 4 in which one piston includes an extension portion received by the other piston.

6. A strut according to claim 3 in which the faces are piston faces of different cross-sectional area and inclined to one another and the movable means defines connected inclined bores each receiving a piston.

7. A strut according to claim 3 in which the faces are end faces of cylinders of different internal diameter and the movable means is a sleeve received by each cylinder.

8. A strut according to claim 3 in which one face is a cylinder end face, the other face is an annular sleeve in the cylinder and the movable member is a piston received by the sleeve.

9. A strut according to claim 3 in which one face is a cylinder end face and the other face is a piston received by a sleeve which is received by the cylinder, the sleeve forming the movable means.

10. A strut according to claim 4 in which one piston engages a brake operating member and the other piston is operable by a brake actuator means, a bias being provided between the other piston and the sleeve.

11. A strut according to claim 4 in which the sleeve is received in a bore of a cylinder and defines with the cylinder a locking chamber and an actuator chamber, the pistons being relatively movable by pressure applied to the actuator chamber to lengthen the strut when pressure in the locking chamber is less than pressure in the actuator chamber, the lengthened strut being adapted to withstand a load when the pressures in the two chambers are substantially equal.

12. A strut according to claim 11 wherein the pistons are operatively connected between vehicle wheel brakes for actuation thereof.

13. A strut according to claim 4 wherein each piston is operably connectable with one of a pair of brake shoes a bias being provided between one piston and the sleeve such as to cause relative movement therebetween to lengthen the strut when the strut is relieved of load.

14. A strut according to claim 13 wherein a lost motion device is provided between one piston and the respective brake shoe.

15. A strut according to claim 6 wherein one piston is operably connectable with a brake actuator means and the other piston is operably connectable with a brake to be actuated by the actuator means, a bias being provided between the movable member and the one piston such as to cause relative movement therebetween to lengthen the strut when the strut is relieved of load.

16. A strut according to claim 15 wherein a back stop is provided acting on the other piston.

17. A strut according to claim 8 wherein the piston is stepped and is received in a bore in the cylinder, the cylinder and sleeve being operatively connectable between a pair of brake shoes to be actuated thereby, and a bias is provided between the sleeve and the piston such as to cause relative movement therebetween to lengthen the strut when the strut is relieved of load.

18. A strut according to claim 17 wherein a lost motion device is provided between the sleeve or cylinder and the respective brake shoe.

19. A strut according to claim 9 wherein the sleeve, piston and strut cylinder are received within a main cylinder and define with the main cylinder a locking chamber and an actuator chamber, the strut being lengthenable by pressure applied to the actuator chamber when pressure in the locking chamber is less than that in the actuator chamber, the lengthened strut being adapted to withstand load when the pressure in the two chambers is substantially equal.

20. A strut according to claim 19 wherein the piston and strut cylinder are operatively connectable between a pair of brake shoes for actuation thereof.

21. A strut according to claim 9 wherein the piston and cylinder are operatively connectable between a pair of brake shoes and a bias is provided between the sleeve and the cylinder such as to cause relative movement therebetween to lengthen the strut when the strut is relieved of load.

22. A strut according to claim 9 wherein the strut cylinder is received within a main cylinder, the piston, strut cylinder and sleeve defining with the main cylinder an actuator chamber, and a bias is provided between the sleeve and the cylinder such as to cause relative movement therebetween to lengthen the strut when the strut is relieved of load.

* * * * *